United States Patent
Nagata

(10) Patent No.: US 9,876,241 B2
(45) Date of Patent: Jan. 23, 2018

(54) FUEL SUPPLY UNIT

(71) Applicant: AISAN KOGYO KABUSHIKI KAISHA, Obu-shi, Aichi-ken (JP)

(72) Inventor: Sadatsugu Nagata, Aichi-gun (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 184 days.

(21) Appl. No.: 14/954,544

(22) Filed: Nov. 30, 2015

(65) Prior Publication Data

US 2016/0177904 A1 Jun. 23, 2016

(30) Foreign Application Priority Data

Dec. 23, 2014 (JP) .................................. 2014-259588

(51) Int. Cl.
  *H01M 8/04* (2016.01)
  *H01M 8/04082* (2016.01)
  *H01M 8/04746* (2016.01)

(52) U.S. Cl.
  CPC ... *H01M 8/04201* (2013.01); *H01M 8/04753* (2013.01)

(58) Field of Classification Search
  CPC .............. H01M 8/04; H01M 8/04082; H01M 8/04089; H01M 8/04104; H01M 8/04201; H01M 8/04753
  See application file for complete search history.

(56) References Cited

U.S. PATENT DOCUMENTS

| | | | |
|---|---|---|---|
| 8,507,138 B2 * | 8/2013 | Yamada | F04F 5/18 137/114 |
| 2002/0106547 A1 * | 8/2002 | Sugawara | F04F 5/461 429/443 |
| 2012/0070758 A1 * | 3/2012 | Odashima | B60L 11/1887 429/444 |
| 2013/0164641 A1 | 6/2013 | Fukuda et al. | |

FOREIGN PATENT DOCUMENTS

| | | |
|---|---|---|
| JP | 2009-129827 A | 6/2009 |
| JP | 2010-267553 A | 11/2010 |
| JP | 2013-134882 A | 7/2013 |

* cited by examiner

*Primary Examiner* — Darren W Gorman
(74) *Attorney, Agent, or Firm* — Oliff PLC

(57) ABSTRACT

A fuel supply unit including injectors to adjust a flow rate and a pressure of fuel gas and an outflow passage of which the fuel gas injected from the injectors will flow out, wherein the fuel supply unit further includes: a branch passage that branches off from the outflow passage and communicates with an injection port of the injector; a specified injector defined as N−1 or less pieces of the injectors when N pieces of the injectors are provided, in which N denotes an integer more than 1; and a pressure reduction member provided in the branch passage that communicates with an injection port of the specified injector, only the specified injector is operated during idling, and the pressure reduction member is configured to decompress injection pressure of the fuel gas which will be injected from the specified injector.

4 Claims, 6 Drawing Sheets

FIG. 3

| INJECTOR | PRESSURE REDUCTION MEMBER | OPERATION REGION |
|---|---|---|
| 1ST INJECTOR | NO (OR LOW-PRICED PRODUCTS) | MID-LOAD TO HIGH-LOAD (IN RUNNING) |
| 2ND INJECTOR | YES | LOW-LOAD (IN IDLING) |
| 3RD INJECTOR | NO (OR LOW-PRICED PRODUCTS) | MID-LOAD TO HIGH-LOAD (IN RUNNING) |

FUEL SUPPLY UNIT

CROSS-REFERENCE TO RELATED APPLICATIONS

This application is based upon and claims the benefit of priority from the prior Japanese Patent Application No. 2014-259588, filed Dec. 23, 2014, the entire contents of which are incorporated herein by reference.

BACKGROUND OF THE INVENTION

Field of the Invention

The present invention relates to a fuel supply unit to be used for adjusting the flow rate and pressure of fuel gas which will be supplied from a fuel container to a supply destination.

Related Art

A fuel cell system disclosed in Patent Document 1 includes a gas supply passage for supplying gas to a fuel cell and an injector installed in the gas supply passage. The injector is provided, on a downstream side of its valve element, with a baffle member formed of a filter. This baffle member is provided for the purpose of preventing generation of impulse wave which is generated by injection of gas from the injector.

RELATED ART DOCUMENTS

Patent Documents

Patent Document 1: JP-A-2009-129827

SUMMARY OF INVENTION

Problems to be Solved by the Invention

However, when a plurality of injectors are used in the fuel cell system disclosed in Patent Document 1, each one of the injectors needs to have a baffle member in order to prevent generation of impulse wave which will be generated in all the injectors. This would result in complex structure and cost increase.

The present invention has been made to solve the above problems and has a purpose to provide a fuel cell system with a simple structure enabling to reduce noise which is caused by injection from an injector.

Means of Solving the Problems

To achieve the above purpose, one aspect of the present invention provides a fuel supply unit including injectors to adjust a flow rate and a pressure of fuel gas and an outflow passage of which the fuel gas injected from the injectors will flow out, wherein the fuel supply unit further includes: a branch passage that branches off from the outflow passage and communicates with an injection port of the injector; a specified injector defined as N−1 or less pieces of the injectors when N pieces of the injectors are provided, in which N denotes an integer more than 1; and a pressure reduction member provided in the branch passage that communicates with an injection port of the specified injector, only the specified injector is operated during idling, and the pressure reduction member is configured to decompress injection pressure of the fuel gas which will be injected from the specified injector.

According to this aspect, during idling, only the specified injector is operated and the pressure reduction member decompresses the injection pressure of the fuel gas which is injected from the injection port of this specified injector. Accordingly, the number of pressure reduction members is reduced, and thus it is enabled to reduce noise caused by injection from the injectors with a simple structure.

Effects of the Invention

According to a fuel supply unit of the present invention, it is possible to reduce noise caused by injection from injectors with a simple structure.

BRIEF DESCRIPTION OF THE DRAWINGS

FIG. 3 is a table showing presence or absence of a pressure reduction member and an operation region of each injector.

DESCRIPTION OF EMBODIMENTS (Explanation of Fuel Cell System)

Figure 1:
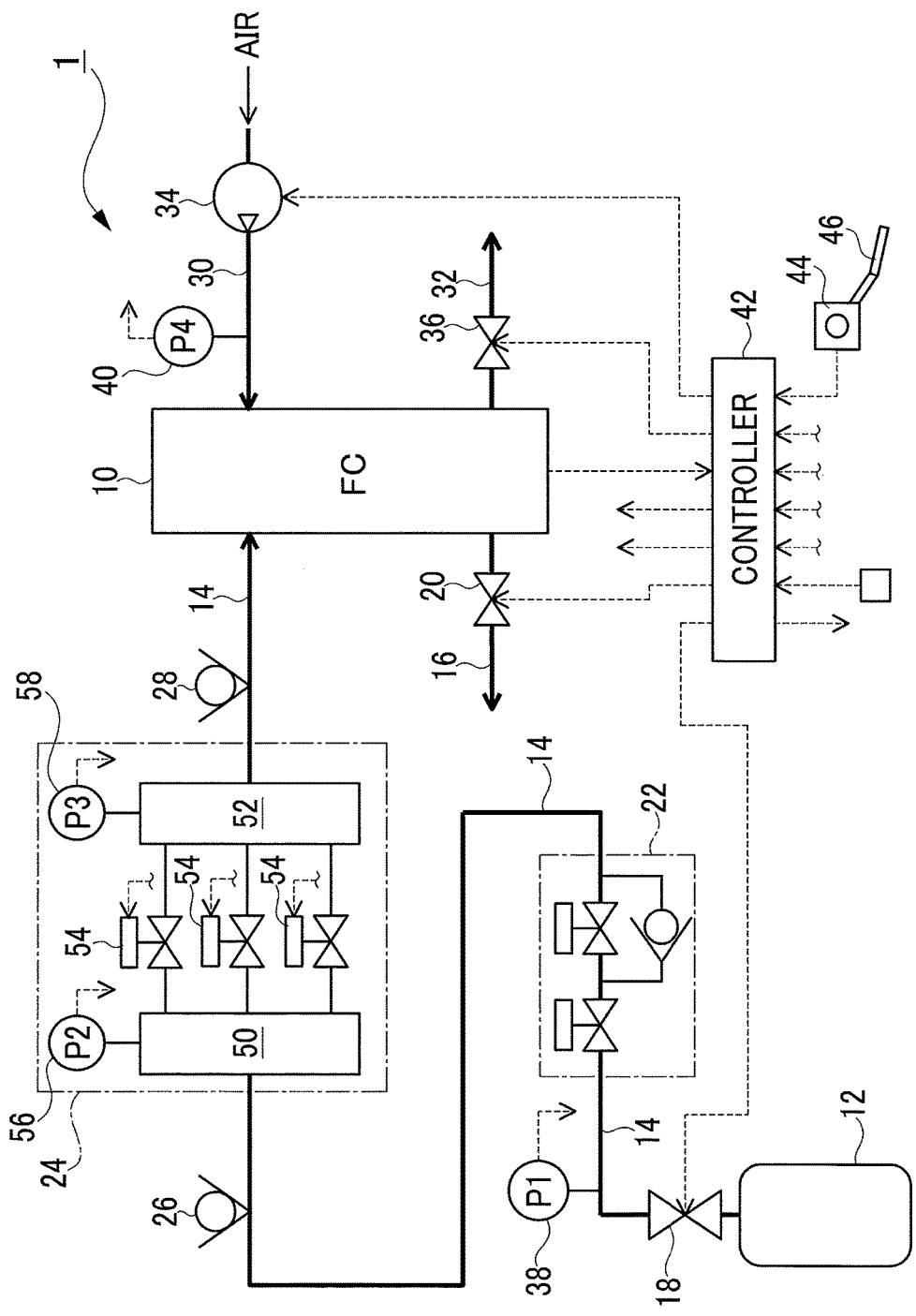
FIG. 1 is a schematic configuration of a fuel cell system.

Firstly, a fuel cell system 1 will be explained. This fuel cell system 1 includes, as shown in FIG. 1, a fuel cell (FC) 10, a hydrogen cylinder 12, a hydrogen supply passage 14, a hydrogen discharge passage 16, a main stop valve 18, a first changeover valve 20, a high-pressure regulator 22, a hydrogen supply unit 24, a middle-pressure relief valve 26, a low-pressure relief valve 28, an air supply passage 30, an air discharge passage 32, an air pump 34, a second changeover valve 36, a primary pressure sensor 38, an air pressure sensor 40, a controller 42, and others.

This fuel cell system 1 will be mounted in an electric vehicle and used to supply electric power to a drive motor (not shown) for the vehicle. The fuel cell 10 generates power upon receipt of hydrogen gas as fuel gas and air as oxidant gas. The electric power generated in the fuel cell 10 is supplied to the drive motor (not shown) through an inverter (not shown). The hydrogen cylinder 12 stores high-pressure hydrogen gas.

On an anode side of the fuel cell 10, a hydrogen supply system is provided. This system includes the hydrogen supply passage 14 for supplying hydrogen gas from the hydrogen cylinder 12 to a supply destination, i.e., the fuel cell 10, and the hydrogen discharge passage 16 for discharging hydrogen off-gas allowed to flow out of the fuel cell 10. In the hydrogen supply passage 14 directly downstream of the hydrogen cylinder 12, the main stop valve 18 is placed, which consists of an electromagnetic valve configured to switch between supplying and shutoff of hydrogen gas from the hydrogen cylinder 12 to the hydrogen supply passage 14. In the hydrogen discharge passage 16, the first changeover valve 20 consisting of an electromagnetic valve is provided.

In the hydrogen supply passage 14 downstream of the main stop valve 18, the high-pressure regulator 22 is provided to reduce the pressure of hydrogen gas. In the hydrogen supply passage 14 between the main stop valve 18 and the high-pressure regulator 22, the primary pressure sensor 38 is provided to detect the internal pressure of the passage 14 as primary pressure P1.

In the hydrogen supply passage 14 downstream of the high-pressure regulator 22, the hydrogen supply unit 24 is provided to adjust the flow rate and pressure of hydrogen gas to be supplied to the fuel cell 10. The hydrogen supply unit 24 is one example of a fuel supply unit of the present invention. The details of the hydrogen supply unit 24 will be explained later.

The middle-pressure relief valve 26 is provided in the hydrogen supply passage 14 between the high-pressure regulator 22 and the hydrogen supply unit 24. The low-pressure relief valve 28 is provided in the hydrogen supply passage 14 between the hydrogen supply unit 24 and the fuel cell 10. Each of the middle-pressure relief valve 26 and the low-pressure relief valve 28 is arranged to open and reduce the pressure when the respective pressure inside the hydrogen supply passage 14 reaches a predetermined value or more.

On the other hand, on a cathode side of the fuel cell 10, there are provided the air supply passage 30 for supplying air to the fuel cell 10 and the air discharge passage 32 for discharging air off-gas allowed to flow out of the fuel cell 10. In the air supply passage 30, the air pump 34 is provided to adjust air flow rate to be supplied to the fuel cell 10. In the air supply passage 30 downstream of the air pump 34, the air pressure sensor 40 is provided to detect air pressure P4. In the air discharge passage 32, the second changeover valve 36 consisting of an electromagnetic valve is provided.

In the foregoing structure, the hydrogen gas delivered from the hydrogen cylinder 12 is supplied to the fuel cell 10 by passing through the hydrogen supply passage 14 via the main stop valve 18, the high-pressure regulator 22, and the hydrogen supply unit 24. The hydrogen gas supplied to the fuel cell 10 is used for power generation in the fuel cell 10 and thereafter is discharged as hydrogen off-gas from the fuel cell 10 via the hydrogen discharge passage 16 and the first changeover valve 20.

Further, in the above structure, the air injected by the air pump 34 into the air supply passage 30 is supplied to the fuel cell 10. This air supplied to the fuel cell 10 is used for power generation in the fuel cell 10 and thereafter is discharged as air off-gas from the fuel cell 10 via the air discharge passage 32 and the second changeover valve 36.

This fuel cell system 1 further includes a controller 42 responsible for controlling the system. In order to control a flow of hydrogen gas to be supplied to the fuel cell 10, the controller 42 controls the main stop valve 18 and injectors 54 provided in the hydrogen supply unit 24 based on detection values of the primary pressure sensor 38, and a secondary pressure sensor 56 and a third-order pressure sensor 58 which are provided in the hydrogen supply unit 24. The controller 42 further controls the first changeover valve 20 in order to control a flow of hydrogen off-gas in the hydrogen discharge passage 16.

On the other hand, the controller 42 controls the air pump 34 based on a detection value of the air pressure sensor 40 to control a flow of the air to be supplied to the fuel cell 10. Further, the controller 42 controls the second changeover valve 36 to control a flow of the air off-gas in the air discharge passage 32. Furthermore, the controller 42 receives a voltage value and a current value resulting from generation of electric power in the fuel cell 10. The controller 42 includes a central processing unit (CPU) and a memory and thus controls each of the injectors 54, the air pump 34, and others based on a predetermined control program stored in the memory to control the flow rate of hydrogen gas and the flow rate of air to be supplied to the fuel cell 10.

Further, the controller 42 controls each of the injectors 54 based on a detection value of a pressed amount (accelerator opening degree) of an accelerator pedal 46, which is detected by an accelerator sensor 44.

(Explanation of Hydrogen Supply Unit)

Next, the hydrogen supply unit 24 will be explained below.

Figure 2:
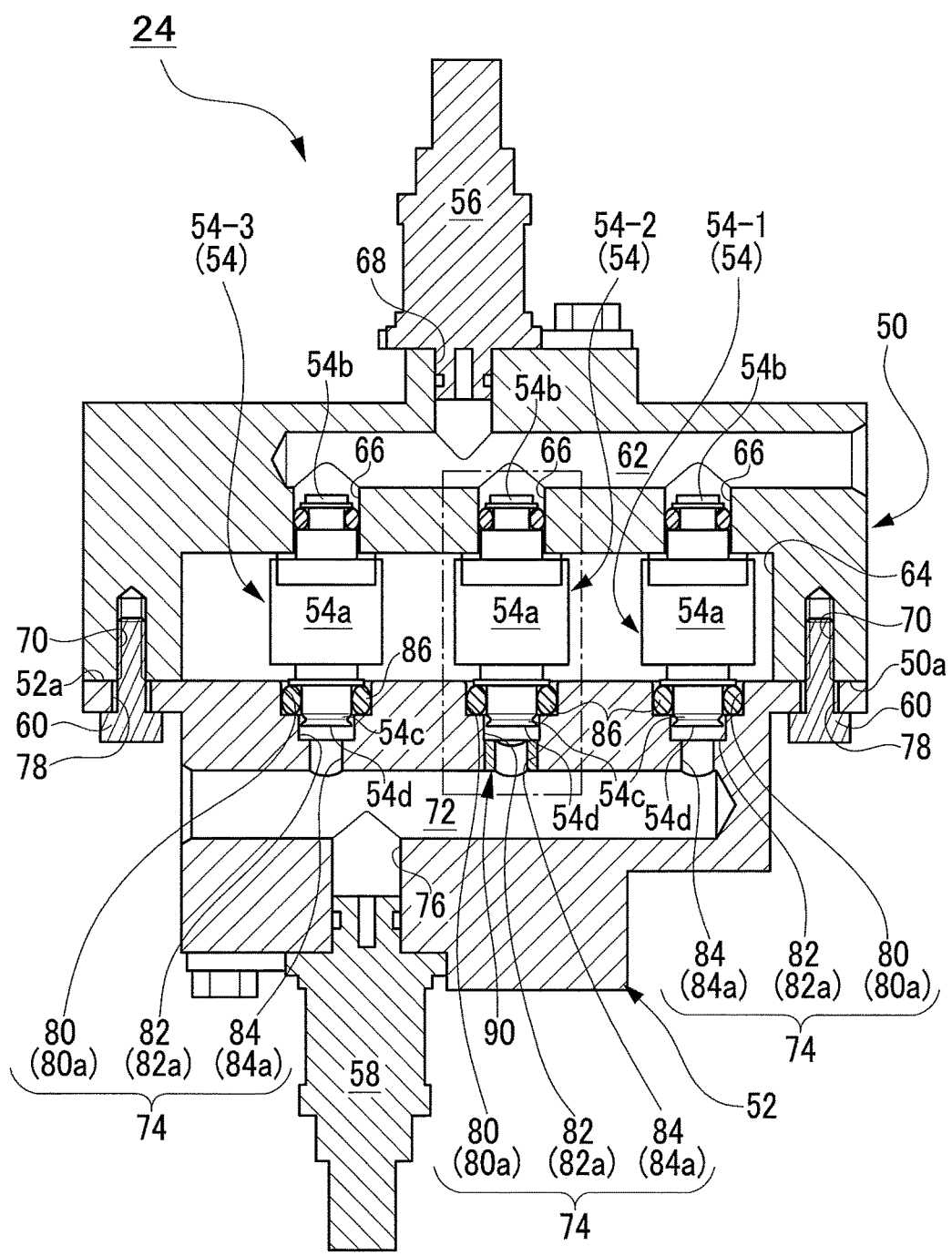
FIG. 2 is a cross sectional view of a hydrogen supply unit.

In the present example, the hydrogen supply unit 24 includes, as shown in FIGS. 1 and 2, an inflow block 50, an outflow block 52, the injectors 54, the secondary pressure sensor 56, the third-order pressure sensor 58, bolts 60, and others.

The inflow block 50 is a member for distributing hydrogen gas in the hydrogen supply passage 14 to the injectors 54. This inflow block 50 includes, as shown in FIG. 2, an inflow passage 62, a cavity 64, inflow holes 66, a sensor hole 68, female screw holes 70, and others.

The inflow passage 62 is a passage in which hydrogen gas flows from the hydrogen supply passage 14. The cavity 64 is recessed from a surface 50a of the inflow block 50 at a side facing the outflow block 52. Inside the cavity 64, the injectors 54 are provided.

The inflow holes 66 are each formed between the inflow passage 62 and the cavity 64. Each of the inflow holes 66 is fitted with an inlet pipe 54b that is located close to an inlet of each injector 54. In the example shown in FIG. 2, three inlet pipes 54b of the injectors 54 are arranged in parallel and connected to the inflow passage 62. The sensor hole 68 is fitted with the secondary pressure sensor 56. To the female screw holes 70, the bolts 60 are fastened. The inflow block 50 is thus fastened with the outflow block 52 by the bolts 60.

The outflow block 52 is a member for allowing jets of hydrogen gas injected from the injectors 54 to merge with each other. This outflow block 52 includes, as shown in FIG. 2, an outflow passage 72, nozzle holes 74, a sensor hole 76, bolt holes 78, and others.

The outflow passage 72 is a passage in which the hydrogen gas injected from the injectors 54 flows. The hydrogen gas is then supplied to the fuel cell 10 from the outflow passage 72 via the hydrogen supply passage 14.

The nozzle holes 74 are provided between a surface 52a of the outflow block 52 at a side facing the inflow block 50 and the outflow passage 72. Each of the thus formed nozzle holes 74 branches off from the outflow passage 72 and is positioned to correspond to each injector 54. The nozzle holes 74 are each fitted with a nozzle pipe 54c located at an exit side of each injector 54. Thus, the nozzle holes 74 communicate with corresponding injection ports 54d formed at a leading end of the nozzle pipe 54c of each injector 54. Accordingly, the hydrogen gas injected from the injectors 54 flows in the outflow passage 72 via the nozzle holes 74. In the example shown in FIG. 2, three nozzle pipes 54c of the injectors 54 are arranged in parallel and connected to the outflow passage 72. The nozzle hole 74 is one example of "a branch passage" of the present invention.

Specifically, each nozzle hole 74 includes a fitting portion 80, an intermediate portion 82, and an exit portion 84 in the order from a surface 52a side. An inner peripheral surface 80a of the fitting portion 80, an inner peripheral surface 82a of the intermediate portion 82, and an inner peripheral surface 84a of the exit portion 84 are each formed cylindrical. The inner peripheral surface 82a of the intermediate portion 82 has a diameter smaller than the inner peripheral surface 80a of the fitting portion 80, and the inner peripheral surface 84a of the exit portion 84 has a diameter smaller than the inner peripheral surface 82a of the intermediate portion 82. Herein, each of the inner peripheral surface 80a of the fitting portion 80, the inner peripheral surface 82a of the intermediate portion 82, and the inner peripheral surface 84a of the exit portion 84 may be shaped tubular besides a cylindrical shape (for example, an almost cylindrical shape or an elliptical cylindrical shape).

Each fitting portion 80 is a portion in which the corresponding nozzle pipe 54c of the injector 54 is fitted via an O ring 86. Each intermediate portion 82 is a portion where the injection port 54d of the corresponding injector 54 is positioned. Each exit portion 84 is a portion formed in an exit portion of the nozzle hole 74 at an outflow passage 72 side.

The sensor hole 76 is fitted with the third-order sensor 58. Further, the bolts 60 are inserted in the bolt holes 78.

The injectors 54 are placed to be held by the inflow block 50 and the outflow block 52. The injectors 54 are thus connected to the inflow passage 62 and the outflow passage 72 to adjust the flow rate and pressure of hydrogen gas.

Each injector 54 includes a body 54a, an inlet pipe 54b, a nozzle pipe 54c, and others. The body 54a is cylindrically shaped. The inlet pipe 54b protrudes from one end of the body 54a and is cylindrically shaped with a diameter smaller than a diameter of the body 54a. The nozzle pipe 54c protrudes from the other end of the body 54a and is cylindrically shaped with a diameter smaller than the diameter of the body 54a. Hydrogen gas enters inside the body 54a through the inlet pipe 54b and then is injected from the injection port 54d which is formed at a leading end of the nozzle pipe 54c. In the example shown in FIG. 2, the hydrogen supply unit 24 has three injectors 54. This number of the provided injectors 54 is not particularly limited and may be two or more than three.

The secondary pressure sensor 56 detects pressure inside (the internal pressure of) the inflow passage 62 as secondary pressure P2 which is middle (medium) pressure. The third-order pressure sensor 58 detects pressure inside the outflow passage 72 as third-order pressure P3 which is low pressure.

The hydrogen supply unit 24 having the above structure includes the injectors 54 which inject the hydrogen gas taken into the inflow passage 62 to the outflow passage 72, and hence hydrogen gas is decompressed.

(Explanation of Noise Reduction Function)

Next, it will be explained a function of reducing noise (flow noise) caused by injection from the injectors 54.

In the hydrogen supply unit 24 of the present example, three injectors 54, namely, a first injector 54-1, a second injector 54-2, and a third injector 54-3, are placed in the order from an upstream side of a hydrogen gas flow direction in the inflow passage 62.

During idling operation (in a region of low-load operation), the controller 42 (see FIG. 1) implements control to drive only the second injector 54-2 which is one injector 54 among the three injectors 54 (see FIG. 3). Herein, the term "during idling" means that an operation state of a vehicle mounted with the fuel cell system 1 is in an idling state. To be specific, the "during idling" represents an operation state of a vehicle in which the fuel cell 10 is in a standby operation with minimum consumption of reaction gas. For instance, this idling means a state in which an accelerator opening degree detected by the accelerator sensor 44 is zero (an acceleration pedal is not pressed down), and a vehicle stops.

Figure 4:
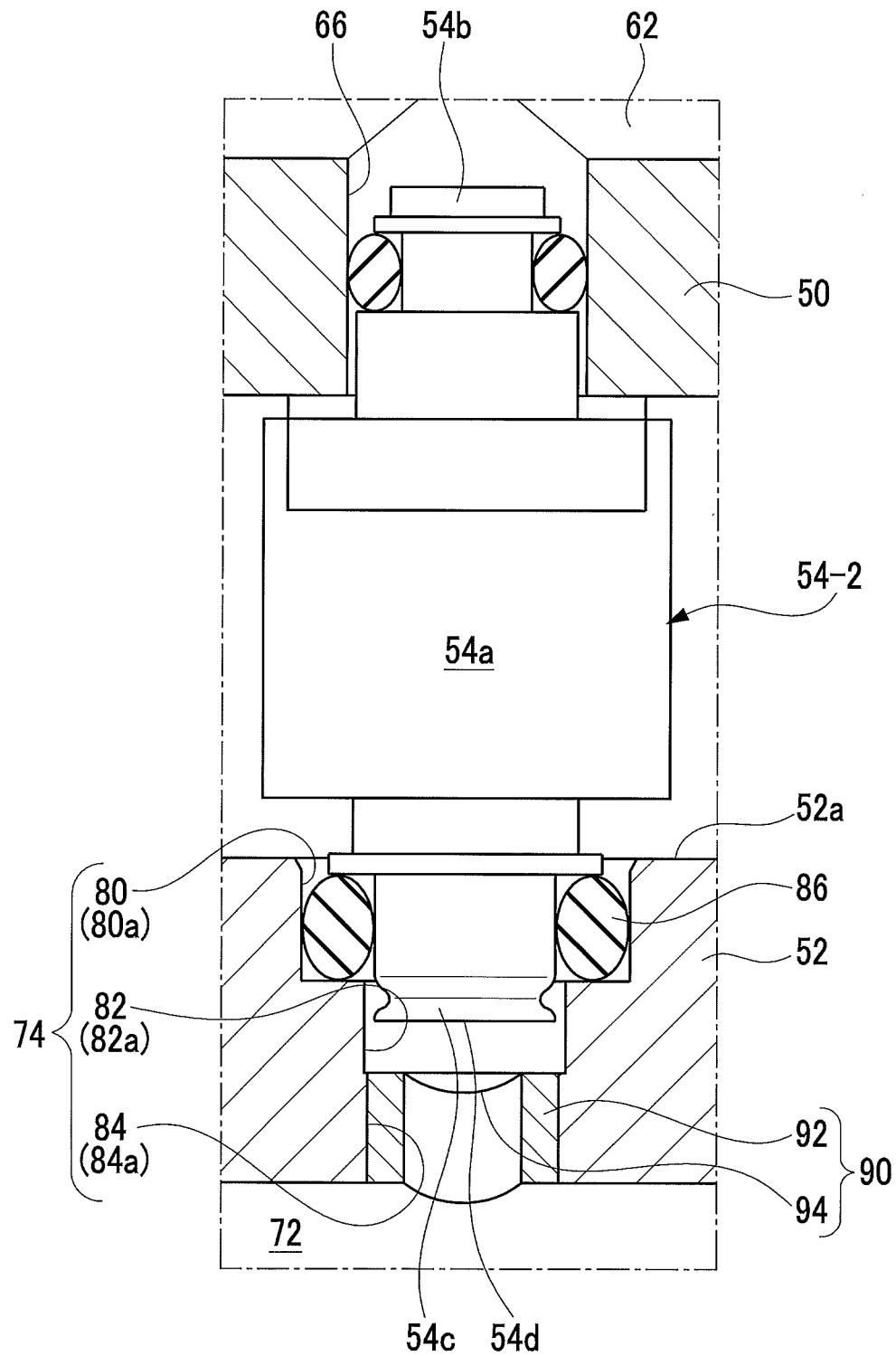
FIG. 4 is an enlarged sectional view of a second injector and its surroundings.

As shown in FIGS. 2 and 4, the hydrogen supply unit 24 includes a pressure reduction member 90 in the nozzle hole 74 in which the nozzle pipe 54c of the second injector 54-2 is fitted. In other words, the pressure reduction member 90 is provided in the exit portion 84 of the nozzle hole 74 that communicates with the injection port 54d of the second injector 54-2. This pressure reduction member 90 is a member for reducing injection pressure of hydrogen gas which will be injected from the injection port 54d of the second injector 54-2.

Figure 5:
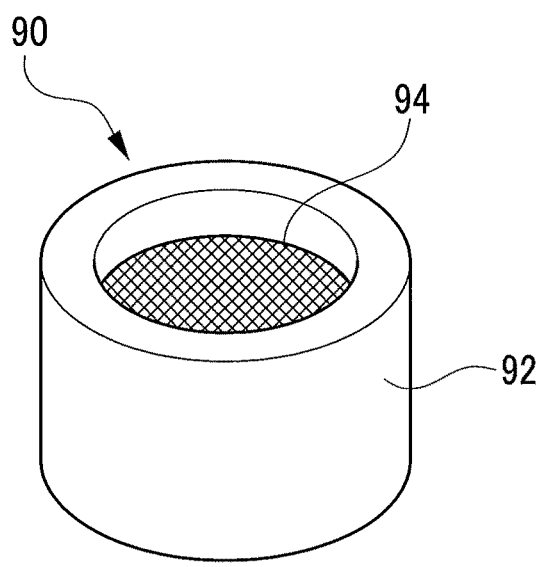
FIG. 5 is an external perspective view of the pressure reduction member.
Figure 6:
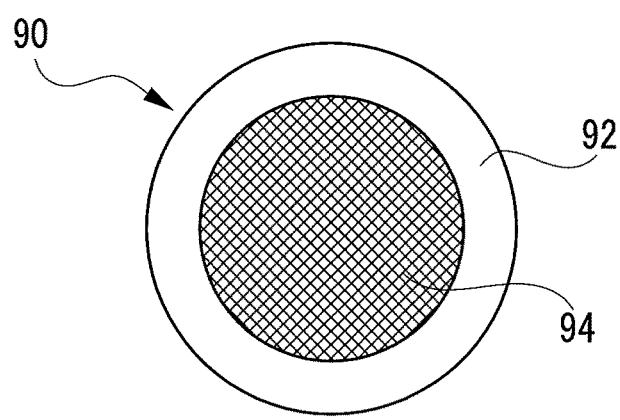
FIG. 6 is a top view of the pressure reduction member.

The pressure reduction member 90 is, as shown in FIGS. 5 and 6, formed by a hollow cylindrical tube member 92 and a mesh material 94 placed inside the tube member 92. The mesh material 94 is a reticulated or screen-like element made of any one of various materials such as metal (stainless steel or the like) and resin. In the present example, the mesh material 94 is formed over the entire area of a cross-section of an internal flow passage of the tube member 92 (see FIG. 6). A mesh size of the mesh material 94 is, in one example, 150 μm to 300 μm. Further, the mesh material 94 is attached to the tube member 92 by swaging or welding. The tube member 92 is formed of any one of various materials such as metal and resin, and attached to the exit portion 84 of the nozzle hole 74 by any one method of swaging, welding, press-fitting, and others.

As one alternative, the pressure reduction member 90 may be made of porous material. Herein, the porous material is formed into a columnar shape (including an almost columnar shape) or a cylindrical shape (including an almost cylindrical shape), and is attachable by itself to the exit portion 84 of the nozzle hole 74. The porous material is, for example, any one of metal porous body (such as stainless steel), resin porous body, and ceramic porous body.

Further, an inner diameter of the tube member 92 is equal or nearly equal to a diameter of each of the inner peripheral surfaces 84a of the exit portions 84 of the nozzle holes 74 in which the corresponding nozzle pipes 54c of the first injector 54-1 and the third injector 54-3 are fitted.

As above, in the hydrogen supply unit 24 of the present example, during idling, only the second injector 54-2 is operated. Further, the pressure reduction member 90 is placed in the exit portion 84 of the nozzle hole 74 which communicates with the injection port 54d of the second injector 54-2, so that injection pressure of the hydrogen gas injected from the second injector 54-2 is reduced. Namely, the injector 54 to be operated during idling, which is a vehicle operation region where noise is expected to be reduced as much as possible, is specified in advance. Then, the pressure reduction member 90 is provided only for the specified injector 54.

Accordingly, during idling, only the second injector 54-2 is operated and the injection pressure of the hydrogen gas injected from the injection port 54d of the second injector 54-2 is reduced by the pressure reduction member 90. The pressure reduction member 90 is thus provided only for the corresponding second injector 54-2, and therefore the number of pressure reduction members 90 can be reduced and hence cost reduction can be achieved. In this manner, during idling, which is the time when noise is expected to be reduced as much as possible, it is enabled with a simple structure to reduce noise (flow noise of hydrogen gas generated due to high injection pressure) caused by injection from the injectors 54. As shown in FIG. 3, the first injector 54-1 and the third injector 54-3 are operated during vehicle running (in a middle-load operation region and in a high-load operation region).

Each of the exit portions 84 of the nozzle holes 74 communicating with the corresponding injection ports 54d of the first injector 54-1 and the third injector 54-3 may be provided with a member (low-priced pressure reduction member) which enables pressure reduction with less expensive and simpler structure than the pressure reduction member 90.

Further, the pressure reduction member 90 is made of porous material or mesh material as mentioned above. Therefore, the pressure reduction member 90 can be formed by a simple structure, and hence cost reduction can be achieved.

Further, the pressure reduction member 90 is made up of the hollow cylindrical tube member 92 and the mesh material 94 that is placed inside the tube member 92. Thus, the tube member 92 has only to be held in the exit portion 84 of the nozzle hole 74 to thereby enable the pressure reduction member 90 to be stably and easily attached to the exit portion 84 of the nozzle hole 74. Accordingly, the injection pressure of the hydrogen gas injected from the injection port 54d of the second injector 54-2 is certainly reduced by the pressure reduction member 90, achieving stable reduction of noise caused by injection from the injector 54. Moreover, operation performance of attaching the pressure reduction member 90 to the exit portion 84 of the nozzle hole 74 is improved.

As one alternative, the first injector 54-1 or the third injector 54-3 may be operated during idling instead of operating the second injector 54-2. As another alternative, during idling, the first injector 54-1 or the third injector 54-3 may be operated as well as operating the second injector 54-2. In those cases, the pressure reduction members 90 are placed in the respective exit portions 84 of the nozzle holes 74 in which the corresponding nozzle pipes 54c of the injectors 54 to be operated are fitted.

Further, the number of injectors 54 provided in the hydrogen supply unit 24 is not particularly limited. For instance, when N pieces of injectors 54 are provided, the controller 42 controls to operate only the specified injectors constituted of (N−1) or less pieces of the injectors 54 among N pieces. The pressure reduction members 90 are placed in the exit portions 84 of the nozzle holes 74 which communicate with respective injection ports 54d of the (N−1) or less pieces of the injectors 54 which are the specified injectors. Thus, the pressure reduction members 90 reduce the injection pressure of hydrogen gas injected from the specified injectors. Herein, N is an integer more than 1.

As a modified example, a flow rate of hydrogen gas injected from the second injector 54-2 as the specified injector may be set to be smaller than a flow rate of hydrogen gas injected from the first injector 54-1 and the third injector 54-3 which are not specified as the specified injector.

Figure 7:
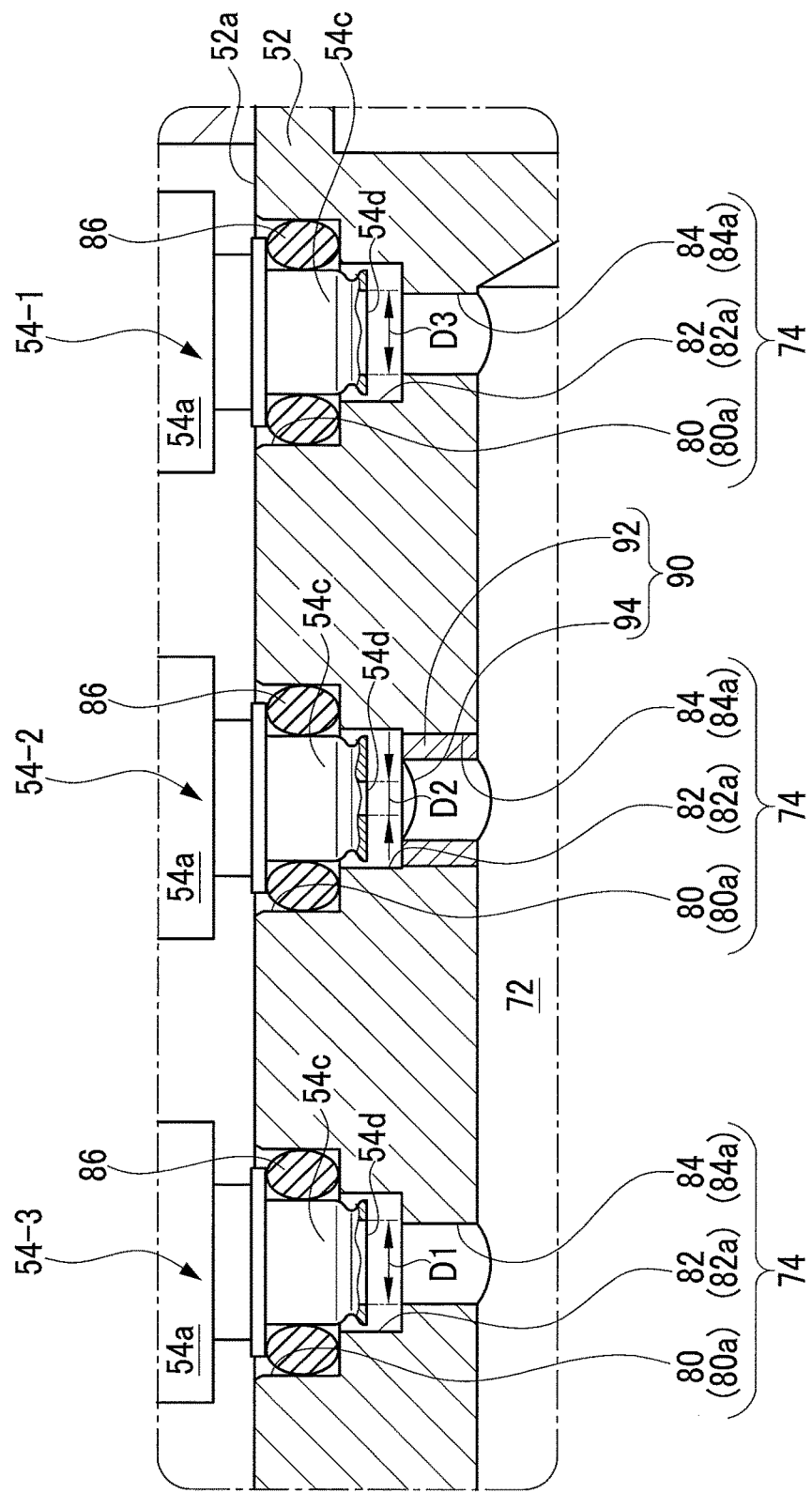
FIG. 7 is an enlarged sectional view of injection ports of injectors and their surroundings in a modified example.

Specifically, as shown in FIG. 7, it is conceivable that a diameter D2 of the injection port 54d of the second injector 54-2 is made smaller than a diameter D1 of the injection port 54d of the first injector 54-1 and a diameter D3 of the injection port 54d of the third injector 54-3 (adjustment of diameter of the injection ports 54d). Further, together with the above-mentioned adjustment of the diameter of the injection ports 54d or separately from the above-mentioned adjustment of the diameter, it is conceivable that a stroke amount of a valve element (not shown) of the second injector 54-2 (a moving amount of the valve element between a valve fully-closed state and a valve fully-opened state) is made smaller than a stroke amount of a valve element of the first injector 54-1 and the third injector 54-3.

In this modified example, a flow rate of hydrogen gas injected from the injection port 54d of the second injector 54-2 is reduced. In other words, when the valve elements of the injectors 54 are opened and closed in one stroke at a predetermined speed, a flow rate of hydrogen gas injected from the injection port 54d of the second injector 54-2 for one stroke is less than flow rate of the first injector 54-1 and the third injector 54-3. Accordingly, during idling operation, the injection pressure of the hydrogen gas injected from the injection port 54d of the second injector 54-2 is reduced, and moreover, further reduced by the pressure reduction member 90. As a result, during idling when the noise is expected to be reduced as much as possible, it is enabled to further preferably reduce the noise caused by injection from the injectors 54.

As above, the present invention is exemplified with the embodiments, but it is not limited to the above embodiments and may be applied with various changes and modifications without departing from the scope of its subject matter. For instance, the controller 42 may control the injectors 54 operated during idling to be driven even during vehicle running. Further, in the pressure reduction member 90, the mesh material 94 may be formed to occupy a part of the cross section of the flow passage of the tube member 92.

REFERENCE SIGNS LIST

1 Fuel cell system
10 Fuel cell
12 Hydrogen cylinder
14 Hydrogen supply passage
24 Hydrogen supply unit
50 Inflow block
52 Outflow block
54 Injector
54-1 First injector
54-2 Second injector
54-3 Third injector
62 Inflow passage
72 Outflow passage
74 Nozzle hole
80 Fitting portion
84 Exit portion
90 Pressure reduction member
92 Tube member
94 Mesh material
D1,D2,D3 Diameter

What is claimed is:
1. A fuel supply unit comprising:
a plurality of injectors that adjust a flow rate and a pressure of fuel gas, a number of the injectors being N, where N denotes an integer greater than 1;
an outflow passage through which the fuel gas flows from the injectors;
a plurality of branch passages that branch off from the outflow passage and communicate with respective injection ports of the injectors;
one or more pressure reduction members provided respectively in respective ones of the branch passages that communicate respectively with respective ones of the injection ports of one or more specified injectors among the plurality of injectors, a number of the one or more specified injectors being greater than zero and equal to or less than N−1; wherein:
only each specified injector is operated during idling, and
each pressure reduction member is configured to decompress injection pressure of the fuel gas injected from a respective one of the one or more specified injectors.
2. The fuel supply unit according to claim 1, wherein each pressure reduction member is made of a porous material or a mesh material.

3. The fuel supply unit according to claim 1, wherein each pressure reduction member is made up of a hollow tube member and a mesh material that is provided inside the tube member.

4. The fuel supply unit according to claim 1, wherein a flow rate of the fuel gas injected from each of the one or more specified injectors is smaller than a flow rate of the fuel gas injected from an injector, among the plurality of injectors, other than the one or more specified injectors.

* * * * *